United States Patent
Alameh et al.

(10) Patent No.: US 10,204,254 B2
(45) Date of Patent: *Feb. 12, 2019

(54) THERMOPILE ENHANCED FINGER PRINT SENSOR

(71) Applicant: Motorola Mobility LLC, Chicago, IL (US)

(72) Inventors: Rachid M Alameh, Crystal Lake, IL (US); Jiri Slaby, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 391 days.

This patent is subject to a terminal disclaimer.

(21) Appl. No.: 14/919,988

(22) Filed: Oct. 22, 2015

(65) Prior Publication Data

US 2017/0116456 A1 Apr. 27, 2017

(51) Int. Cl.
*G06K 9/00* (2006.01)

(52) U.S. Cl.
CPC .. *G06K 9/00013* (2013.01); *G06F 2203/0338* (2013.01)

(58) Field of Classification Search
CPC .. G06K 9/0002; G06K 9/0004; G06F 21/316; G06F 1/1626; G01J 5/046

USPC .................. 250/338.1; 345/212; 361/679.01; 382/124

See application file for complete search history.

(56) References Cited

U.S. PATENT DOCUMENTS

| | | | | |
|---|---|---|---|---|
| 2004/0208345 | A1* | 10/2004 | Chou .................. | G06K 9/0002 382/124 |
| 2004/0252867 | A1* | 12/2004 | Lan ...................... | G06K 9/0004 382/124 |
| 2008/0259071 | A1* | 10/2008 | Nemoto ................ | G06F 21/316 345/212 |
| 2015/0085432 | A1* | 3/2015 | Memering ............ | G06F 1/1626 361/679.01 |
| 2016/0041038 | A1* | 2/2016 | Geiger .................... | G01J 5/046 250/338.1 |

\* cited by examiner

*Primary Examiner* — Abdul-Samad A Adediran
(74) *Attorney, Agent, or Firm* — Matthew C. Loppnow; The Watson I.P. Group, PLC (57) ABSTRACT

A user device can include finger print sensor, a thermopile, and a housing. The finger print sensor can be configured to sense a finger print of a user of the apparatus. The thermopile, proximate to the finger print sensor, can be configured to sense a change in thermal energy from the user proximate to the finger print sensor. The housing can include a thermal path for the thermal energy from the user to reach the thermopile. The thermopile can trigger a configuration change of at least one of a hardware element of the apparatus and a software application executing on the apparatus in response to the thermopile sensing the change in the thermal energy.

20 Claims, 4 Drawing Sheets

FIGURE 4

THERMOPILE ENHANCED FINGER PRINT SENSOR

CROSS-REFERENCE TO RELATED APPLICATIONS

This application is related to an application entitled "DUAL DIAGONAL THERMOPILE CONTROL OF AN APPARATUS," U.S. patent application Ser. No. 14/931,212, filed on even date herewith and commonly assigned to the assignee of the present application, which is hereby incorporated by reference.

BACKGROUND

1. Field

The present disclosure is directed to a method and apparatus for providing enhanced functionality to a finger print sensor of an apparatus. More particularly, the present disclosure is directed to providing touch detection and/or approach detection to an apparatus including a finger print sensor.

2. Introduction

Finger print sensors are becoming commonplace on user devices, such as smart phones and table computers. Finger print sensors capture a digital image of a newly acquired fingerprint pattern. A user device compares the newly acquired fingerprint pattern to one or more previously stored fingerprint patterns. The user device verifies a match between the newly acquired fingerprint pattern and the previously stored fingerprint patterns as a basis for verifying the user.

Finger print verification relies on various types of technologies as a basis for reading a fingerprint. Such technologies include optical fingerprint imaging, ultrasonic imaging, capacitance imaging, passive capacitance imaging, and active capacitance. Irrespective of the underlying technology used to acquire a fingerprint pattern, an algorithm compares the newly acquired fingerprint pattern to one or more previously stored fingerprint patterns as a basis for verifying the user.

Fingerprint verification is used by portable apparatuses as verification for various actions taken by a user. Fingerprint verification is used to "unlock" a portable apparatus, confirm "app" purchases, confirm a mobile payment, confirm a digital wallet transaction, etc. Fingerprint verification simplifies such actions taken by the user, eliminating having to remember multiple passwords or personal identification numbers (PINs), and having to manually enter such passwords or PINs as verification of actions taken by the user.

Finger print sensors are integrated with a push key/button that provides various types of functionality to the user devices. Activation of the push key/button signals a user's desire to wake up a sleeping device, return to a home screen, close an active application, place an active application into a low priority mode, etc. User devices also include push keys/buttons to control volume of a speaker of the user device and a power key/button to turn the user device on and off.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

There is a need for a method and apparatus that allows for enhanced functionality of a finger print sensor. There is a need to eliminate keys/buttons on a user device that may become a leakage point.

Embodiments provide a method and apparatus, such as a user device, comprising a finger print sensor, a thermopile, and a housing. The finger print sensor can be configured to sense a finger print of a user of the apparatus. The thermopile, proximate to the finger print sensor, can be configured to sense a change in thermal energy from the user proximate to the finger print sensor. The housing can include a thermal path for the thermal energy from the user to reach the thermopile. The thermopile can trigger a configuration change of at least one of a hardware element of the apparatus and a software application executing on the apparatus in response to the thermopile sensing the change in the thermal energy.

Embodiments provide an apparatus, such as a user device, comprising a finger print sensor, a thermopile, and a housing. The finger print sensor can be configured to sense a finger print of a user of the apparatus. The thermopile, proximate to the finger print sensor, can be configured to sense a change in thermal energy from the user proximate to the finger print sensor. The housing can include a contact thermal path for the thermal energy from the user contacting the housing to reach the thermopile and a proximity thermal path for the thermal energy from the user in proximity to the apparatus to reach the thermopile. The thermopile can triggers a configuration change of at least one of a hardware element of the apparatus and a software application executing on the apparatus in response to the thermopile sensing the change in the thermal energy.

Figure 1:
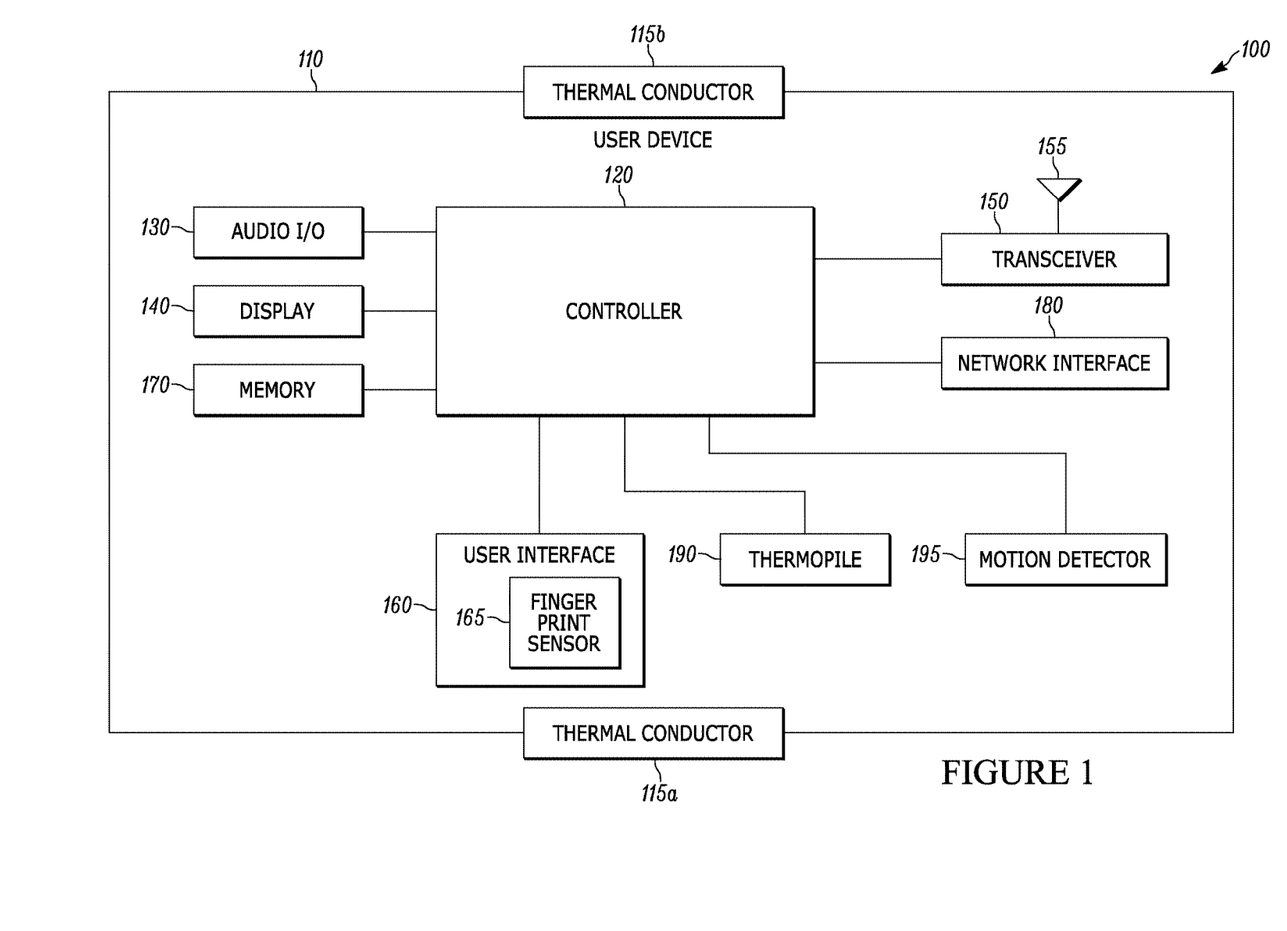
FIG. 1 illustrates a block diagram of an example user device, according to one or more possible embodiments.

FIG. 1 illustrates a block diagram of an example user device 100, according to one or more possible embodiments. The user device 100 can be a wireless terminal, a portable wireless communication device, a smartphone, a cellular telephone, a flip phone, a personal digital assistant, a personal computer, a tablet computer, a remote control, or any other user device 100 that can benefit from a thermopile 190 enhanced finger print sensor 165.

The user device 100 can include a housing 110, a controller 120 within the housing 110, audio input and output circuitry 130 coupled to the controller 120, a display 140 coupled to the controller 120, a transceiver 150 coupled to the controller 120, an antenna 155 coupled to the transceiver 150, a user interface 160 coupled to the controller 120, a memory 170 coupled to the controller 120, a thermopile 190 coupled to the controller 120, a motion detector 195 (for example, an accelerometer) coupled to the controller 120, and a network interface 180 coupled to the controller 120. The user device 100 can perform the methods described in all the embodiments.

The display 140 can be a viewfinder, a liquid crystal display (LCD), a light emitting diode (LED) display, a plasma display, a projection display, a touch screen display, or any other device that displays information. The transceiver 150 can include a transmitter and/or a receiver. The audio input and output circuitry 130 can include a microphone, a speaker, a transducer, or any other audio input and output circuitry. The user interface 160 can include a keypad, a keyboard, buttons, a touch pad, a joystick, a touch screen display, another additional display, the finger print sensor 165, and/or any other device useful for providing an interface between a user and an electronic device. The network interface 180 can be a universal serial bus port, an Ethernet port, an infrared transmitter/receiver, a USB port, an IEEE 1394 port, a WLAN transceiver, or any other interface that can connect an apparatus to a network or computer and that can transmit and receive data communication signals. The memory 170 can include a random access memory, a read only memory, an optical memory, a flash memory, a removable memory, a hard drive, a cache, or any other memory that can be coupled to the user device 100.

The user device 100 or the controller 120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 170 or elsewhere on the user device 100. The user device 100 or the controller 120 may also use hardware to implement disclosed operations. For example, the controller 120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 120 may be any controller or processor device or devices capable of operating an electronic device and implementing the disclosed embodiments.

The network interface 180 can be a wired communication interface, such as a universal serial bus interface, a serial wire interface, a parallel wire interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces. The transceiver 150 can be a wireless wide area network transceiver that can receive a random challenge and an authentication token from a wireless wide area network.

The thermopile 190 can include a digital output. The thermopile 190 can sense a change in thermal energy that occurs outside of and/or on a surface of the housing 110 and generate a thermal signature accordingly. Such a change in thermal energy can be a result of a user touching the housing 110 and/or a user approaching the housing 110 within a range that allows detection of the user's thermal energy by the thermopile 190. The thermopile 190 can include a plurality of thermocouples in series or in parallel. The thermopile 190 can operate on less than 10 micro amps.

The thermopile 190 can trigger a configuration change of at least one of a hardware element of the user device 100 and a software application executing on the user device 100 in response to the thermopile 190 sensing a change in thermal energy. The controller 120 can change such a configuration. In one or more embodiments, the thermopile 190 can remain activated even when other electronic components of the user device 100 are turned off to conserve power. In such an instance, the thermopile 190 can turn on the user device 100 when sensing a change in thermal energy. The thermopile 190 can activate the other electronic components of the user device 100 when sensing a change in thermal energy, performing the functionality of a power key/button used on present user devices. For example, a user of the user device 100 can touch the housing 110 of the user device 100 for a predetermined period of time set by a manufacturer of the user device 100. After the predetermined period of time, the thermopile 190 can trigger the user device 100 to be turned off if the user device 100 is currently turned on, and the user device 100 can be turned on if the user device 100 is currently turned off.

The housing 110 of the user device 100 can include one or more thermal conductors 115, for example 115a and 115b. The thermal conductors 115a and 115b can be of a same configuration or of a different configuration(s). The thermal conductors 115a and 115b can be comprised of a same material or of a different material(s). The thermal conductors 115a and/or 115b can provide a path for thermal energy in contact with the housing 110 and non-contact thermal energy from outside of the housing 110 to reach the thermopile 190. The thermal conductors 115a and 115b can be comprised of a different material than that with which the housing 110 is constructed, or can be a same material with which the housing 110 is constructed. The thermal conductors 115a and 115b can include a metal (for example, aluminum, stainless steel, titanium, brass, and/or any other material that allows for thermal conduction), polyethylene, silicone, germanium, infrared chalcogenide glass, and/or any other thermally conductive material that allows thermal energy from outside of the housing 110 to reach the thermopile 190. The thermal conductors 115a and 115b can be a portion of the user interface 160 that makes up the housing 110, for example a glass portion a touch screen display that makes up a portion of the housing 110. The thermal conductor 115a can be proximate to the finger print sensor 165 and/or proximate to a front side of the user device 100. Thermal conductor 115a can provide a path for thermal energy proximate to the front of the user device 100 to reach the thermopile 190. Thermal conductor 115b can be proximate to a back side of the user device 100. Thermal conductor 115b can provide a path for thermal energy proximate to the back side of the user device 100 to reach the thermopile 190.

Figure 2A:
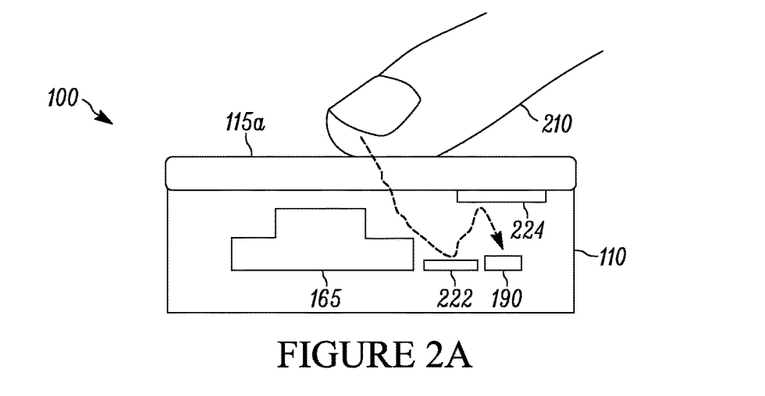
FIGS. 2A-C illustrate a cross sectional view of the example user device utilizing reflective thermal conduction, according to one or more possible embodiments.
Figure 2B:
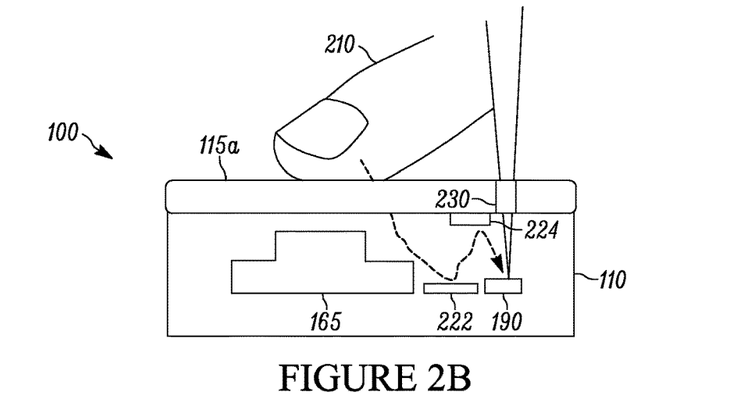
Figure 2C:
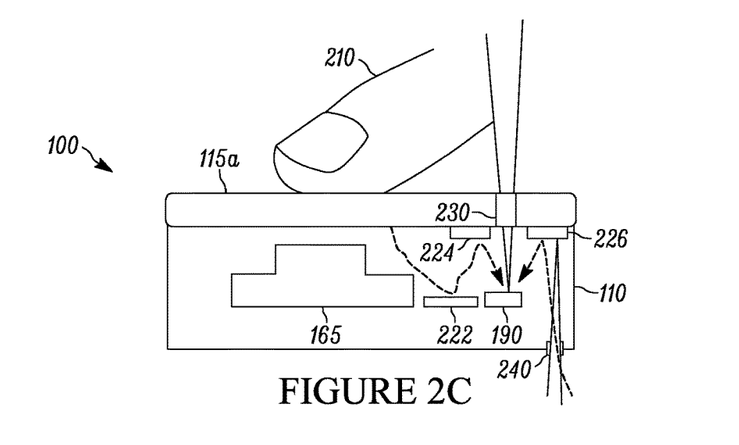

FIGS. 2A-C illustrate a cross sectional view of an example user device 100 utilizing reflective thermal conduction, according to one or more possible embodiments. The user device 100 can include reflectors 222 and 224, and reflector 226. The reflectors 222, 224, and 226 can be comprised of metal, for example aluminum, stainless steel, titanium, and/or any other material that for allows for thermal reflection. Two reflectors 222 and 224 are illustrated as conducting thermal energy from a front of the user device 100, and a single reflector 226 is illustrated as conducting thermal energy from a back of the user device 100. However, the location, position, number, and size of the reflectors can be a function of the orientation of the thermopile 190 and a function of a direction from which thermal energy is emanating from. The thermal reflection used herein can follow wave reflection mechanisms from the finger 210 to the thermopile 190.

The user device 100 can include a thermal path comprised of a thermal conductor 115a that makes up a top portion of the housing 110. The thermal conductor 115a can be constructed of, for example, glass, ceramic, sapphire crystal, or any other material that allows for thermal energy transfer through the housing 110 from a point of the finger 210 of the user to below the point of contact of the finger 210 to a thermal conductor, such as aluminum and/or portions of a touch screen display of the user interface 160. The user device 100 can include reflectors 222 and 224 as part of the thermal path from the finger 210 of a user of the user device 100 and the thermopile 190. Reflector 222 can be positioned between the finger print reader 165 and the thermopile 190 and reflector 224 can be positioned in front of the thermopile 190.

As shown, thermal energy from the finger 210 can pass through the thermal conductor 115a. The thermal energy can then first bounce off of reflector 222 to reach reflector 224. The thermal energy can next bounce off of reflector 224 to reach the thermopile 190. The configuration of the reflectors 222 and 224 shown in FIGS. 2A-C can provide a narrow path between the finger print sensor 165 and reflector 224 for thermal energy to reach reflector 222. This narrow path can be beneficial to limit activation of the thermopile 190 to when the finger 210 is touching the thermal conductor 115a within a narrow area on the surface of the thermal conductor 115a between the finger print sensor 165 and the reflector 224.

FIG. 2B illustrates a cross sectional view of the example user device 100 shown in FIG. 2A utilizing approach detection, according to one or more possible embodiments. The user device 100 can utilize one or more of touch detection and approach detection. The user device 100 can include a window 230 and a reflector 224 positioned in front of and offset to the thermopile 190.

The thermal conductor 115a of the housing 110 can include a window 230 as part of the thermal path through which non-touch thermal energy within proximity of a front of the user device 100 can reach the thermopile 190. The window 230 can be filled with a thermally conductive material that allows the non-touch thermal energy within the proximity of the user device 100 to reach the thermopile 190. The window 230 can be an existing window within the housing 110 of the user device 100, such as a speaker opening, microphone opening, charging port opening, and/or any other openings within the housing 110 of the user device 100. The window 230 can be filled with, for example, polyethylene (for example, high density polyethylene (HDPE)), silicone, germanium, infrared chalcogenide glass, speaker mesh, and/or any other material that allows non-touch thermal energy within the proximity of the user device 100 to reach the thermopile 190. The window 230 can be a hole in the thermal conductor 115a sized to provide a narrow field of view. Such a narrow field of view can limit extraneous thermal energy from reaching the thermopile 190, such as other persons within a vicinity of a user using the user device 100. Reflector 224 can be sized to provide a path for both thermal energy from a finger 210 touching a surface of the thermal conductor 115a to reach the thermopile 190 and non-touch thermal energy in a proximity of the user device 100 to pass through window 230 to reach the thermopile 190.

The window 230 can provide a path for thermal energy from a user of the user device 100 to reach the thermopile 190 even when the user is not touching the thermal conductor 115a. For example, the thermopile 190 can generate a thermal signature from thermal energy generated when a user of the user device 100 is looking into the window 230 while not touching the thermal conductor 115a. For example, the user device 100 can determine, via the motion detector 195, that the user device 100 is stationary or moving. The user device 100 can determine, via the motion detector 195, that the user has picked up the user device 100. The user device 100 can determine that the user is looking into the user device 100, via the thermal energy passing from the user through window 230 to the thermopile 190. The thermopile 190 can generate a thermal signature from the thermal energy sensed by the thermopile 190 while a user of the user device 100 is looking into the window 230. In such an instance, the thermopile 190 can wake up the display 120 from a non-active state.

The thermopile 190 can be positioned offset away from the finger print sensor 165. Such a position can allow the finger print sensor 165 to detect the finger 210 touching the finger print sensor 165. Such a position also can prevent saturation of the thermopile 190 that would occur should the finger 230 cover the window 230 if the thermopile 190 were placed immediately adjacent to the finger print sensor 165.

The finger print sensor 165 consumes power even when not reading a finger print of the finger 210. The user device 100 can turn off the finger print sensor 165 to conserve power. The user device 100 can detect, via the window 230 and the thermopile 190 thermal energy from the finger 210 approaching the finger print sensor 165. The user device 100 can activate the finger print sensor 165 in response to the finger 210 approaching the finger print sensor 165 to conserve power.

FIG. 2C illustrates a cross sectional view of an example user device 100 utilizing rear approach detection, according to one or more possible embodiments. The user device 100 can include a window 240 and a reflector 226.

The housing 110 of the user device 100 can include the window 240 as part of the thermal path through which non-touch thermal energy within proximity of a rear of the user device 100 can reach the thermopile 190. The window 240 can be an existing window within the housing 110 of the user device 100, such as a speaker opening, microphone opening, charging port opening, and/or any other openings within the housing 110 of the user device 100. The window 240 can be filled with a thermally conductive material that allows the non-touch thermal energy within the proximity of the user device 100 to reach the thermopile 190. The window 240 can be filled with, for example, polyethylene, silicone, germanium, infrared chalcogenide glass, speaker mesh, and/or any other material that allows non-touch thermal energy within the proximity of the user device 100 to reach the thermopile 190. The window 240 can be a hole in the rear of the housing 110 sized to provide a narrow field of view. Such a narrow field of view can limit extraneous thermal energy from reaching the thermopile 190, such as other persons within a vicinity of a user using the user device 100. Non-touch thermal energy within a vicinity of the rear of the user device 100 can reflect off of the reflector 226 to reach the thermopile 190. A single thermopile 190 can generate separate thermal signatures indicating thermal energy generated by the finger 210 touching the thermal conductor 115a, non-touch thermal energy within a vicinity of the user device 100 passing through window 230, and/or non-touch thermal energy within a vicinity of the user device 100 passing through window 240.

For example, the user device 100 can determine that a user of the user device 100 is not holding the user device 100 in their hand. When a user of the user device 100 places the user device 100 in their pocket, the user device 100 can receive thermal energy from only one side of the user device 100. The user device 100 can determine, via a thermal signature produced by the thermopile 190, when thermal energy is being received from only one side of the user device 100. The user device 100 can determine that a user is physically contacting the thermal conductor 115a and/or that the user device 100 is receiving thermal energy via the window 230, while simultaneously not receiving thermal energy from the back of the user device 100, via the window 240. In such an instance, the user device 100 can disable the touch screen display user interface 160 to avoid unwanted touch screen inputs, such as making an unwanted call, texting an unwanted message, activating an unwanted software application, and/or any other action not desired by a user of the user device 100 in such a particular instance. Likewise, the touch screen display user interface 160 can be disabled when thermal energy is received from the back of the user device 100 and not from the front of the user device 100, indicating that the user of the user device 100 is not holding the user device 100.

For example, the user device 100 can determine that a user of the user device 100 desires to answer an incoming call without the user physically touching the user device 100. The user device 100 can detect a hand motion proximate to but not touching window 230 or 240 of the user device 100. The motion detector 195 of the user device 100 can determine that the user device 100 is stationary, for example placed on a table. The thermopile 190 can generate a heat signature from the non-contact thermal energy received via the window 230 and/or 240 from the user waving a hand over the user device 100. The user device 100 can use such a heat signature to trigger the user device 100 to answer an incoming call. In one or more embodiments, the user device 100 can use such a heat signature to trigger a speakerphone mode of the user device 100. Such hand waving activation of the user device 100 to answer an incoming call with a hand wave can be performed by the user device 100 irrespective of an orientation, either facing up or facing down, of the user device 100. In one or more embodiments, the user device 100 can use the heat signature produced by a user waving a hand proximate to the window 230 or 240 to silence an alert associated with an incoming call. The user device 100 can be configured by the user of the user device 100 to perform specific actions in response to the heat signature produced by the user waving a hand proximate to window 230 or 240.

For example, the user device 100 can determine that a person, other that the user of the user device 100, has entered a field of view of the user device 100. The thermopile 190 can detect thermal energy, via the window 230, and generate a baseline heat signature when a user of the user device 100 begins interaction with the user device 100. The thermopile 190 can detect thermal energy, via the window 230, and generate an updated heat signature indicating multiple heat signatures are detected via the window 230, when an extraneous person that is not the user of the user device 100 enters a field of view of the user device 100. The user device 100 can display a message to the user of the user device 100 informing the user that a possible privacy breach has occurred due to an extraneous person entering a field of view of the user device 100. In one or more embodiments, the user device 100 can close or minimize a software application executing on the user device 100 in response to the thermopile 190 detecting an extraneous person within a field of view of the user device 100 to protect privacy. In one or more embodiments, the user device 100 can lock itself and display a screen saver in response to the thermopile 190 detecting an extraneous person within a field of view of the user device 100 to protect privacy.

FIGS. 3A-D illustrate a cross sectional view of an example user device 100 utilizing metallic thermal conduction, according to one or more possible embodiments.

Figure 3A:
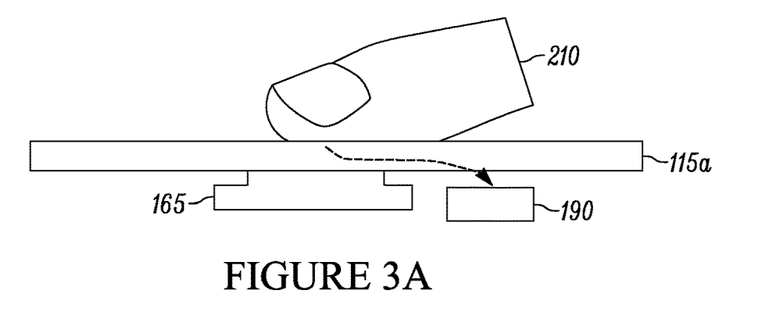
FIGS. 3A-D illustrate a cross sectional view of the example user device utilizing metallic thermal conduction, according to one or more possible embodiments.
Figure 3B:
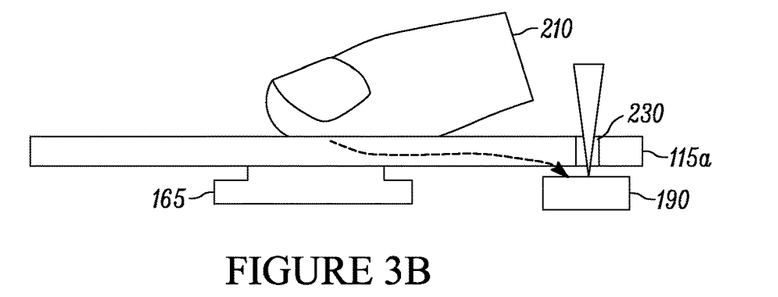

As shown in FIGS. 3A and 3B, the user device 100 can include a metallic thermal conductor 115a (for example, aluminum, titanium, stainless steel, brass, or any other material that allows for thermal energy conduction) to make up at least a portion of a top portion of the housing 110. The use of a metallic thermal conductor 115a can allow for the thermopile 190 to sense thermal energy without using the reflectors 222, 224, and 226 shown in FIGS. 2A and 2B. The thermopile 190 can sense the thermal energy without using the reflectors 222, 224, and 226 if positioned with a proper orientation and pointing in a proper direction.

Figure 3C:
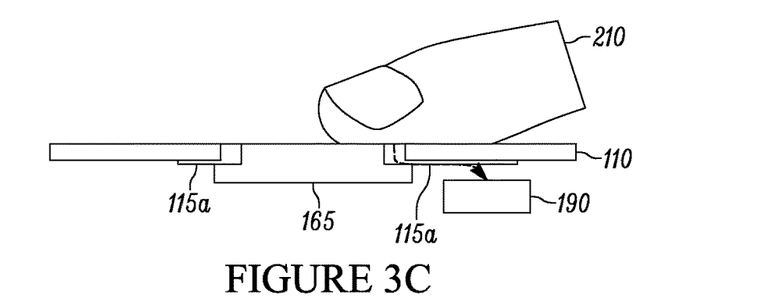
Figure 3D:
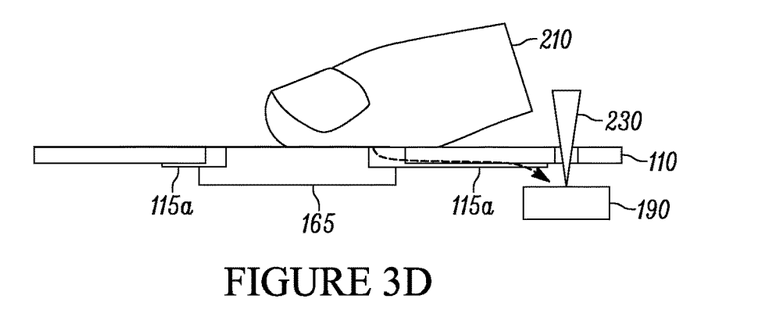

As shown in FIGS. 3C and 3D, the user device 100 can include a metallic thermal conductor 115a that can be a portion of the housing 110. The thermal conductor 115a portion of the housing 110 can extend from a top of the top portion of the housing 110 to a bottom of the top portion of the housing 110. The thermal conductor 115a can extend along at least one side of the finger print sensor 165. In one or more embodiments, the conductor 115a can frame the finger print sensor 165, as shown in FIGS. 3C and 3D. The thermal conductor 115a can extend along a bottom of the top portion of the housing 110 between the finger print sensor 165 and an area above the thermopile 190. The thermal conductor 115a can conduct thermal energy from the finger 210 to the thermopile 190 when the finger 210 contacts an area next to the finger print sensor 165.

Although not illustrated for simplification, the user device 100 utilizing metallic thermal conduction illustrated in FIGS. 3A-3D can further include a reflector 226 and a window 240. The reflector 226 and the window 240 can allow a user device 100 utilizing metallic thermal conduction on a front of the housing 110 to sense a thermal change from a back of the housing 110. In such an embodiment, a single thermopile 190 can be used to sense a thermal change and produce a thermal signature from thermal energy received from a front of the user device 100 and/or thermal energy received from a back of the user device 100.

Although not illustrated for simplification, the user device 100 can further include the metallic thermal conductor 115a, shown in FIGS. 3C and 3D, on a back of the user device 100. Such a metallic thermal conductor 115a can conduct contact thermal energy from a back of the housing 110 to the thermopile 190. In such an embodiment, the thermopile 190 can be used to sense a thermal change and produce a thermal signature from contact thermal energy received from a back of the user device 100. Such contact thermal energy from the back of the user device 100 can be received when a user of the user device 100 holds the user device 100, such as when making a phone call and/or utilizing a software application executing on the user device 100. Such contact thermal energy from the back of the user device 100 can be received when a user of the user device 100 places the user device 100 in a pocket of the user.

Figure 4:
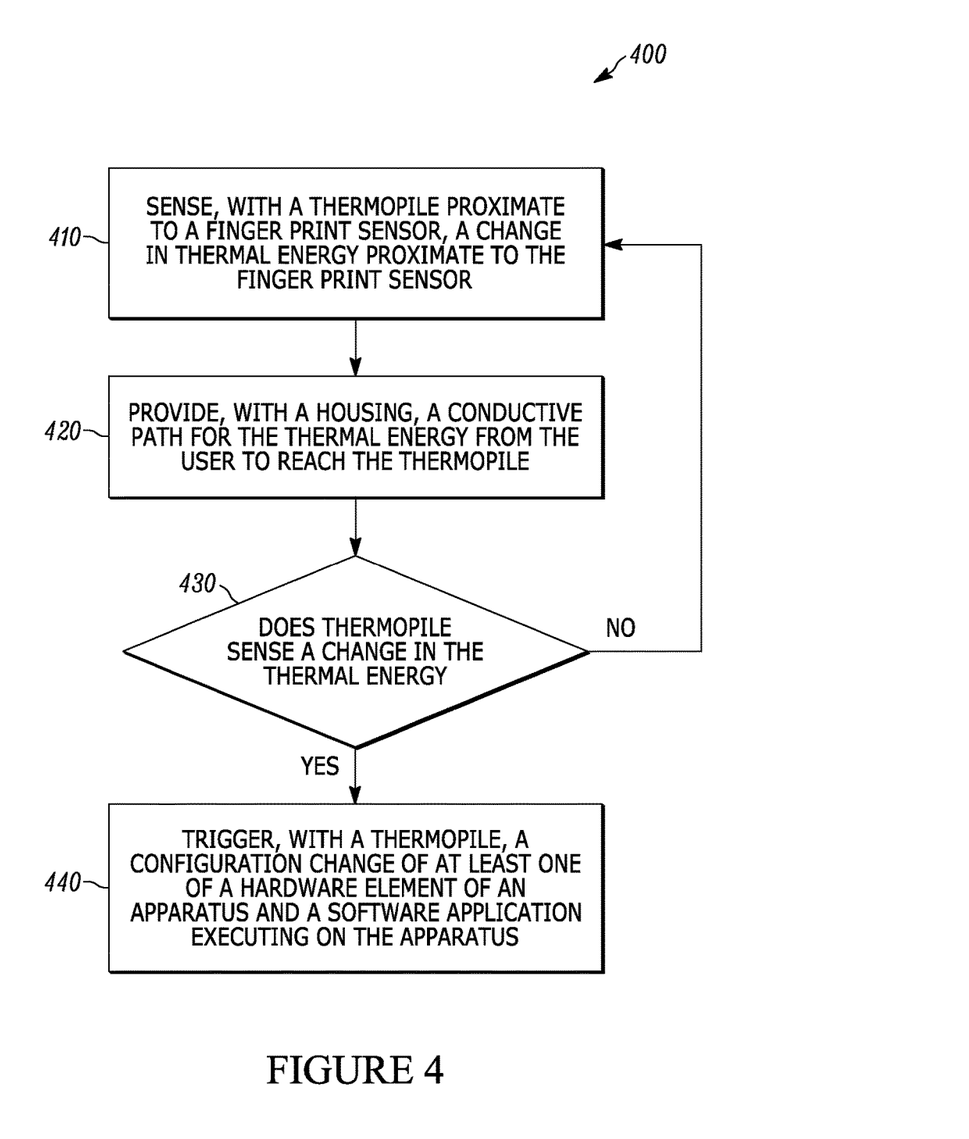
FIG. 4 illustrates a flowchart of an example method of sensing a thermal energy change with the example user device, according to a possible embodiment.

FIG. 4 illustrates a flowchart of an example method 400 of sensing a thermal energy change with the example user device 100, according to a possible embodiment.

At block 410, the method 400 can sense, with the thermopile 190 proximate to the finger print sensor 165, a change in thermal energy from a user proximate to the finger print sensor 165. The user device 100 can sense a change in contact thermal energy and non-contact thermal energy from a user approaching the user device 100 from a front and/or a rear of the user device 100. The use device 100 can sense the contact thermal energy via the thermal conductors 115*a* and/or 115*b*. The use device 100 can sense the non-contact thermal energy via window 230 and/or window 240. Block 410 can proceed to block 420.

At block 420, the method 400 can provide, with at least a portion of the housing 110, the thermal conductor 115 as a thermal path for the thermal energy from a user of the user device 100 to reach the thermopile 190. Block 420 can proceed to block 430.

At block 430, the method 400 can determine whether the thermopile 190 senses a change in thermal energy. In response to the thermopile 190 sensing the change in thermal energy, block 430 can branch to block 440. Should the thermopile 190 not sense a change in the thermal energy, block 430 can branch to block 410 to allow the thermopile 190 to continue to monitor for the change in thermal energy.

At block 440, the method 400 can trigger, with the thermopile 190, a configuration change of at least one of a hardware element of the user device 100 and a software application executing on the user device 100. The controller 120 can be configured to change such a configuration.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus, comprising:
   a finger print sensor that senses a finger print of a user of the apparatus;
   a thermopile, only outside of the finger print sensor, where the thermopile senses a change in thermal energy from the user proximate to the finger print sensor; and
   a housing including a thermal path for the thermal energy from the user to reach the thermopile,
   wherein the thermopile triggers a configuration change of at least one of a hardware element of the apparatus and a software application executing on the apparatus in response to the thermopile sensing the change in the thermal energy.

2. The apparatus according to claim 1, wherein the housing includes at least one of metal, glass, ceramic, and sapphire crystal that provide the thermal path for the thermal energy to reach the thermopile.

3. The apparatus according to claim 1,
   wherein the thermal path includes a reflector, the reflector being in front of and offset to the thermopile, and
   wherein the thermal energy from a back of the apparatus reflects off of the reflector to reach the thermopile.

4. The apparatus according to claim 1,
   wherein the housing includes a surface contact thermal path for the thermal energy from the user contacting a surface of the housing to reach the thermopile, and
   wherein the housing includes a non-contact proximity thermal path for the thermal energy from the user in non-contact proximity to the apparatus to reach the thermopile.

5. The apparatus according to claim 4, wherein the non-contact proximity thermal path includes a window within the housing of the apparatus for the thermal energy to reach the thermopile.

6. The apparatus according to claim 5, wherein the window is comprised of at least one of polyethylene, silicone, germanium, infrared chalcogenide glass, a speaker opening, a microphone opening, and a charging port opening.

7. The apparatus according to claim 1, wherein the thermopile turns on at least one of the apparatus, the finger print sensor, and a touch screen display in response to the change in the thermal energy proximate to the finger print sensor.

8. The apparatus according to claim 1, wherein the thermal path includes a first reflector and a second reflector, the first reflector positioned between the finger print reader and the thermopile and the second reflector positioned in front of and offset to the thermopile, wherein the thermal energy bounces off of the first and second reflectors to reach the thermopile.

9. The apparatus according to claim 8, wherein the thermal path includes a third reflector, the third reflector being in front of and offset to the thermopile, offset in an opposite direction relative to the second reflector, and
   wherein the thermal energy from a back of the apparatus reflects off of the third reflector to reach the thermopile.

10. The apparatus according to claim 1, wherein the apparatus is a smartphone, a cellular telephone, a flip phone, a personal digital assistant, a personal computer, a tablet computer, or a remote control.

11. A method, comprising:
    sensing, with a thermopile only outside of a finger print sensor, a change in thermal energy proximate to the finger print sensor;
    providing, with at least a portion of a housing, a thermal path for the thermal energy from a user to reach the thermopile; and
    triggering, with the thermopile, a configuration change of at least one of a hardware element of an apparatus and a software application executing on the apparatus in response to the thermopile sensing the change in the thermal energy.

12. The method according to claim 11, wherein the housing includes at least one of metal, glass, ceramic, sapphire crystal that provide the thermal path for the thermal energy to reach the thermopile.

13. The method according to claim 11, further comprising:
    including a reflector with the thermal path, the reflector being in front of and offset to the thermopile, and
    wherein the thermal energy from a back of the apparatus reflects off of the reflector to reach the thermopile.

14. The method according to claim 11, further comprising:
    including, with the housing, a surface contact thermal path for the thermal energy from the user contacting a surface of the housing to reach the thermopile, and
    including, with the housing, a non-contact proximity thermal path for the thermal energy from the user in non-contact proximity to the apparatus to reach the thermopile.

15. The method according to claim 14, further comprising including, with the non-contact proximity thermal path, a window within the housing of the apparatus for the thermal energy to reach the thermopile.

16. The method according to claim 15, wherein the window is comprised of at least one of polyethylene, silicone, germanium, infrared chalcogenide glass, a speaker opening, a microphone opening, and a charging port opening.

17. The method according to claim 11, further comprising turning on, with the thermopile, at least one of the apparatus, the finger print sensor, and a touch screen display in response to the change in the thermal energy proximate to the finger print sensor.

18. The method according to claim 11, including a first reflector and a second reflector in the thermal path, the first reflector positioned between the finger print reader and the thermopile and the second reflector positioned in front of and offset to the thermopile, wherein the thermal energy bounces off of the first and second reflectors to reach the thermopile.

19. The method according to claim 18, further comprising including a third reflector in the thermal path, the third reflector being in front of and offset to the thermopile, offset in an opposite direction relative to the second reflector, wherein the thermal energy from a back of the apparatus reflects off of the third reflector to reach the thermopile.

20. An apparatus, comprising:
    a finger print sensor that senses a finger print of a user of the apparatus;
    a thermopile, only outside of the finger print sensor, where the thermopile senses a change in thermal energy from the user proximate to the finger print sensor;
    a processor coupled to the finger print sensor and coupled to the thermopile; and
    a housing including a contact thermal path for the thermal energy from the user contacting the housing to reach the thermopile and a proximity thermal path for the thermal energy from the user in proximity to the apparatus to reach the thermopile,
    wherein the thermopile triggers a configuration change of at least one of a hardware element of the apparatus and a software application executing on the apparatus in response to the thermopile sensing the change in the thermal energy, and
    wherein the processor turns off the finger print sensor to conserve power, detects, via the thermopile, a finger of the user approaching the finger print sensor, and activates the finger print sensor in response to the finger of the user approaching the finger print sensor.

* * * * *